US012443915B2

(12) United States Patent
Ferreira

(10) Patent No.: US 12,443,915 B2
(45) Date of Patent: Oct. 14, 2025

(54) SYSTEM AND METHOD TO STORE AND DISPENSE IMMUNOASSAY

(71) Applicant: Quest Diagnostics Investments LLC, Secaucus, NJ (US)

(72) Inventor: Silvino M. Ferreira, Andover, MA (US)

(73) Assignee: Quest Diagnostics Investments LLC, Secaucus, NJ (US)

( * ) Notice: Subject to any disclaimer, the term of this patent is extended or adjusted under 35 U.S.C. 154(b) by 812 days.

(21) Appl. No.: 17/622,035

(22) PCT Filed: Jun. 19, 2020

(86) PCT No.: PCT/US2020/038629
§ 371 (c)(1),
(2) Date: Dec. 22, 2021

(87) PCT Pub. No.: WO2020/263696
PCT Pub. Date: Dec. 30, 2020

(65) Prior Publication Data
US 2022/0277257 A1    Sep. 1, 2022

Related U.S. Application Data

(60) Provisional application No. 62/867,124, filed on Jun. 26, 2019.

(51) Int. Cl.
*G06Q 10/087*  (2023.01)
*A47F 1/08*  (2006.01)

(52) U.S. Cl.
CPC ............. *G06Q 10/087* (2013.01); *A47F 1/08* (2013.01)

(58) Field of Classification Search
CPC ................................ G06Q 10/087; A47F 1/08
(Continued)

(56) References Cited

U.S. PATENT DOCUMENTS 3,501,131 A * 3/1970 Grantham ............... B01F 31/22
366/202
3,957,174 A    5/1976 Palamara
(Continued)

FOREIGN PATENT DOCUMENTS

CA        2369358 A1    7/2002
CN     104105431 A    10/2014
(Continued)

OTHER PUBLICATIONS

Office Action in CN 202080059064.2, dated Jan. 11, 2024, with English translation.
(Continued)

*Primary Examiner* — Rakesh Kumar
(74) *Attorney, Agent, or Firm* — DUANE MORRIS LLP

(57) ABSTRACT

An inventory storage system including a container with an upper surface, a lower surface, a back wall and a front wall facing a width of the upper surface and the lower surface, a first removal slot disposed between the front wall and the lower surface, and a pair of sidewalls facing a length of the upper and lower surfaces. The container includes dividers defining one or more sections. The container includes pens stored within the sections of the container, the pens including at least a subset of first pens and a subset of second pens, with the subset of first pens is below the subset of second pens. The container includes spacers that prevent the subset of second pens from exiting the container via the first removal slot until the subset of first pens exit the container via the first removal slot.

16 Claims, 9 Drawing Sheets

(58) Field of Classification Search
USPC .......................................................... 221/22
See application file for complete search history.

(56) References Cited

U.S. PATENT DOCUMENTS

| | | | |
|---|---|---|---|
| 4,597,614 A | 7/1986 | Alexander | |
| 5,295,608 A | 3/1994 | Blasko et al. | |
| 5,458,260 A * | 10/1995 | Sainato | G07F 11/04 |
| | | | 221/172 |
| 5,957,325 A * | 9/1999 | Montanez | A47F 1/08 |
| | | | 221/281 |
| 6,062,424 A | 5/2000 | Simile-Gravina et al. | |
| 6,068,156 A * | 5/2000 | Liff | G06V 20/66 |
| | | | 221/129 |
| 6,406,107 B1 * | 6/2002 | Franczak | A47F 1/08 |
| | | | 211/49.1 |
| 8,136,697 B2 | 3/2012 | Hackney | |
| 9,149,405 B2 * | 10/2015 | Braun | G07F 11/10 |
| 9,934,365 B2 * | 4/2018 | Turnell | A61J 7/0481 |
| 10,262,490 B2 * | 4/2019 | Wilson | G07F 11/04 |
| 2003/0221348 A1 | 12/2003 | Morrison | |
| 2005/0211721 A1 * | 9/2005 | Chirnomas | G07F 11/04 |
| | | | 221/123 |
| 2006/0027639 A1 | 2/2006 | Rasmussen | |
| 2006/0074524 A1 | 4/2006 | Chirnomas | |
| 2010/0228392 A1 * | 9/2010 | Braun | G07F 11/007 |
| | | | 700/242 |
| 2012/0200385 A1 | 8/2012 | Savage et al. | |
| 2013/0134119 A1 | 5/2013 | Loftin et al. | |
| 2013/0270978 A1 * | 10/2013 | Black | A47F 1/08 |
| | | | 312/72 |
| 2014/0297487 A1 | 10/2014 | Bashkin | |
| 2016/0318696 A1 | 11/2016 | Romito et al. | |
| 2018/0150793 A1 * | 5/2018 | Lert, Jr. | B65G 1/1373 |
| 2019/0159476 A1 * | 5/2019 | Anziano | A23G 9/22 |
| 2020/0178705 A1 * | 6/2020 | Barzee | A47B 57/585 |
| 2022/0047073 A1 * | 2/2022 | Ghrir | A47F 7/281 |
| 2022/0277257 A1 * | 9/2022 | Ferreira | G06Q 10/087 |

FOREIGN PATENT DOCUMENTS

| | | | | |
|---|---|---|---|---|
| CN | 105620929 A | | 6/2016 | |
| CN | 118451029 A | * | 8/2024 | ............. B65G 61/00 |
| WO | WO-2016/069218 A1 | | 5/2016 | |
| WO | WO-2019045949 A1 | * | 3/2019 | ............. A47B 67/02 |

OTHER PUBLICATIONS

International Search Report and Written Opinion dated Sep. 28, 2020 in PCT/US2020/038629.

Supplementary European Search Report dated Jun. 22, 2023 in EP 20832006.

Office Action and Search Report dated Jul. 24, 2023 in CN 202080059064.2, with English translations.

* cited by examiner

SYSTEM AND METHOD TO STORE AND DISPENSE IMMUNOASSAY

CROSS-REFERENCE TO RELATED PATENT APPLICATIONS

This application is a national stage application of International Patent Application No. PCT/US2020/038629, titled "SYSTEM AND METHOD TO STORE AND DISPENSE IMMUNOASSAY," filed Jun. 19, 2020, which claims priority to and the benefit of U.S. Patent Application No. 62/867,124, titled "SYSTEM AND METHOD TO STORE AND DISPENSE IMMUNOASSAY," and filed Jun. 26, 2019, each of which is incorporated herein by reference in its entirety for all purposes.

BACKGROUND

The present disclosure relates generally to a system and method of storing and dispensing immunoassay devices. More specifically, the present disclosure relates to systems and methods of storing and dispensing an immunoassay device that facilitates inventory procedures.

SUMMARY OF THE INVENTION

At least one embodiment relates to an inventory storage system. The inventory storage system includes a container. The container includes an upper surface, a lower surface, a back wall and a front wall facing a width of the upper surface and the lower surface, a first removal slot disposed between the front wall and the lower surface, and a pair of sidewalls facing a length of the upper surface and the lower surface. The inventory storage system includes one or more dividers disposed between the pair of sidewalls along the length of the upper surface and the lower surface, extending from the lower surface and the upper surface, and extending from the front wall to the back wall. The one or more dividers can define one or more sections. The inventory storage system includes a plurality of pens stored within the one or more sections of the container including at least a subset of first pens and a subset of second pens. The subset of first pens can be below the subset of second pens. The inventory management system includes one or more spacers placed within the one or more sections of the container between the subset of first pens and the subset of second pens. The one or more spacers can prevent the subset of second pens from exiting the container via the first removal slot until the subset of first pens exit the container via the first removal slot.

At least one embodiment relates to the spacers having data identifying different lots of pens stored within the container.

At least one embodiment relates to the one or more spacers placed within the one or more sections of the container at predetermined intervals among the plurality of pens such that a predetermined quantity of pens is disposed between the one or more spacers.

At least one embodiment relates to the spacers removed from the container via the first removal slot indicates usage of the predetermined quantity of pens.

At least one embodiment relates to the subset of second pens exiting the container via a second removal slot. The second removal slot can be disposed along the front wall and above the first removal slot, so the subset of second pens are removed from the container prior to removing the subset of first pens.

At least one embodiment relates to the subset of second pens introduced to a section of the one or more sections of the container are disposed on top of the subset of first pens and the one or more spacers already stored within the section of the one or more sections of the container.

At least one embodiment relates to the subset of second pens positioned further from the removal slot than the subset of first pens and the one or more spacers stored within the one of the one or more sections of the container.

At least one embodiment relates to the front wall comprises a second removal slot disposed along the front wall and above the first removal slot.

At least one embodiment relates to the one or more spacers between the subset of first pens and the subset of second pens exiting the container via a second removal slot. The second removal slot can be disposed along the front wall and above the first removal slot to combine the subset of first pens and the subset of second pens into a subset of third pens.

At least one embodiment relates to at least one pen having a tubular housing configured to receive a sample of material.

At least one embodiment relates to an inventory storage system a container comprising an upper surface, a lower surface, a back wall and a front wall facing a width of the upper surface and the lower surface, a first removal slot disposed between the front wall and the lower surface, and a pair of sidewalls facing a length of the upper surface and the lower surface. The system includes one or more components disposed between the pair of sidewalls along the length of the upper surface and the lower surface, extending from the lower surface to the upper surface, and extending from the front wall to the back wall, the one or more components defining one or more sections. The system includes a plurality of products stored within the one or more sections of the container, the plurality of products comprising at least a subset of first products and a subset of second products, wherein the subset of first products below the subset of second products. The system includes one or more indicators placed within the one or more sections of the container between the subset of first products and the subset of second products. The one or more indicators preventing the subset of second products from exiting the container via the first removal slot until the subset of first products exit the container via the first removal slot.

At least one embodiment relates to the one or more indicators include data identifying different sections of products stored within the container.

At least one embodiment relates to the one or more components placed within the one or more sections of the container at known intervals among the plurality of products such that a known quantity of products is disposed between the one or more components.

At least one embodiment relates to the one or more components removed from the container via the removal slot indicating usage of the known quantity of products.

At least one embodiment relates to the one or more indicators between the subset of first products and the subset of second products exiting the container via a second removal slot. The second removal slot can be disposed along the front wall and above the first removal slot to combine the subset of first products and the subset of second products into a subset of third products.

At least one embodiment relates to a method for inventory storage. The method can include inserting a first subset of a plurality of products between a pair of sidewalls of a container. The method can include inserting one or more components between the pair of sidewalls to define one or more sections of the container. The method can include attaching a first indicator to one or more components of the container adjacent to the first subset of the plurality of products to identify the one or more sections defined by the one or more components. The method can include inserting a second subset of the plurality of products adjacent to the first indicator. The first subset of the plurality of products can be below the first indicator. The first indicator can be below the second subset of the plurality of products. The method can include removing at least one product of the plurality of products from the one or more sections of the container through a first removal slot until the first indicator is disposed in the first removal slot to remove the first subset of the plurality of products while retaining the second subset of the plurality of products within the container.

At least one embodiment relates to inserting the second subset of the plurality of products after inserting the one or more components and the first subset of the plurality of products.

At least one embodiment relates to inserting the first subset of the plurality of products between the pair of sidewalls of the container comprises inserting the first subset of the plurality of products through an insertion slot above the removal slot and between the pair of sidewalls of the container.

At least one embodiment relates to removing the first indicator through the removal slot while retaining the second subset of the plurality of products within the container.

At least one embodiment relates to counting the first subset of the plurality of products based on data associated with the first indicator removed via the first removal slot.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Systems and methods described herein can be used for storing and dispensing immunoassay devices. A container (e.g., housing) can store multiple immunoassay devices therein in a method that facilitates efficient inventory procedures. Additionally, the container can position immunoassay devices for use. The container can also receive, store, and, in response to removal of immunoassay devices for use, reposition immunoassay devices within the container such that first received immunoassay devices are the first immunoassay devices to exit (a first-in-first-out (FIFO) model).

Figure 1B:
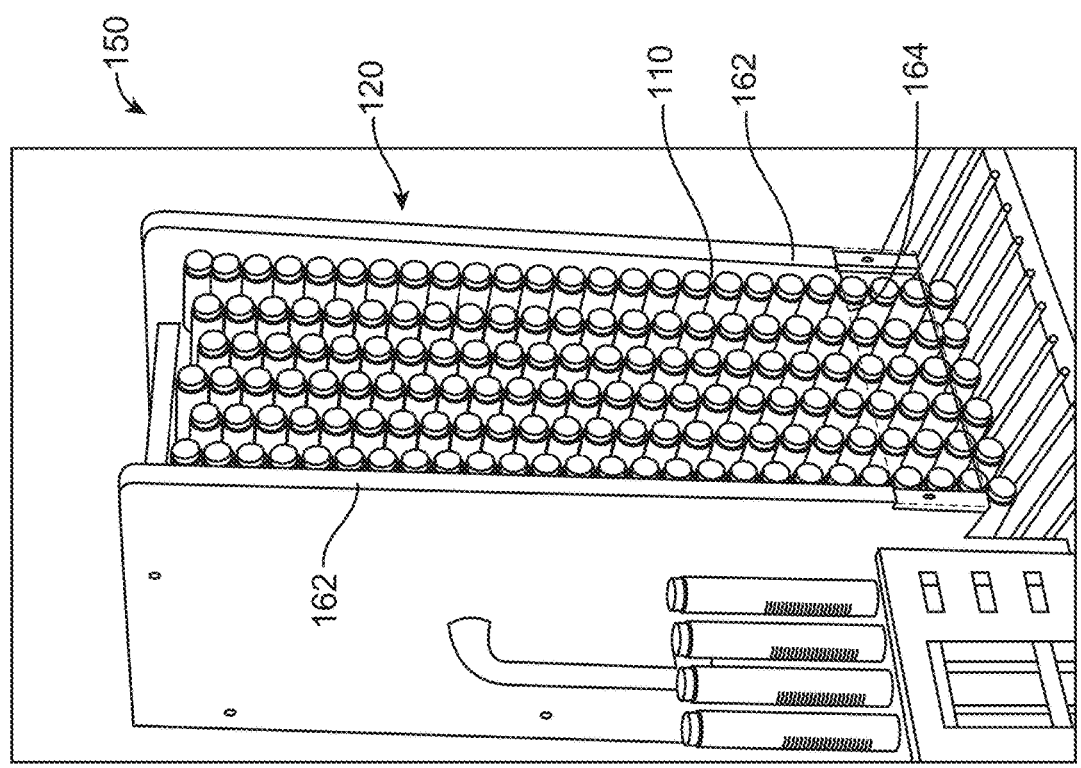
FIG. 1B is an example of a system for storing and dispensing immunoassay pens.
Figure 1A:
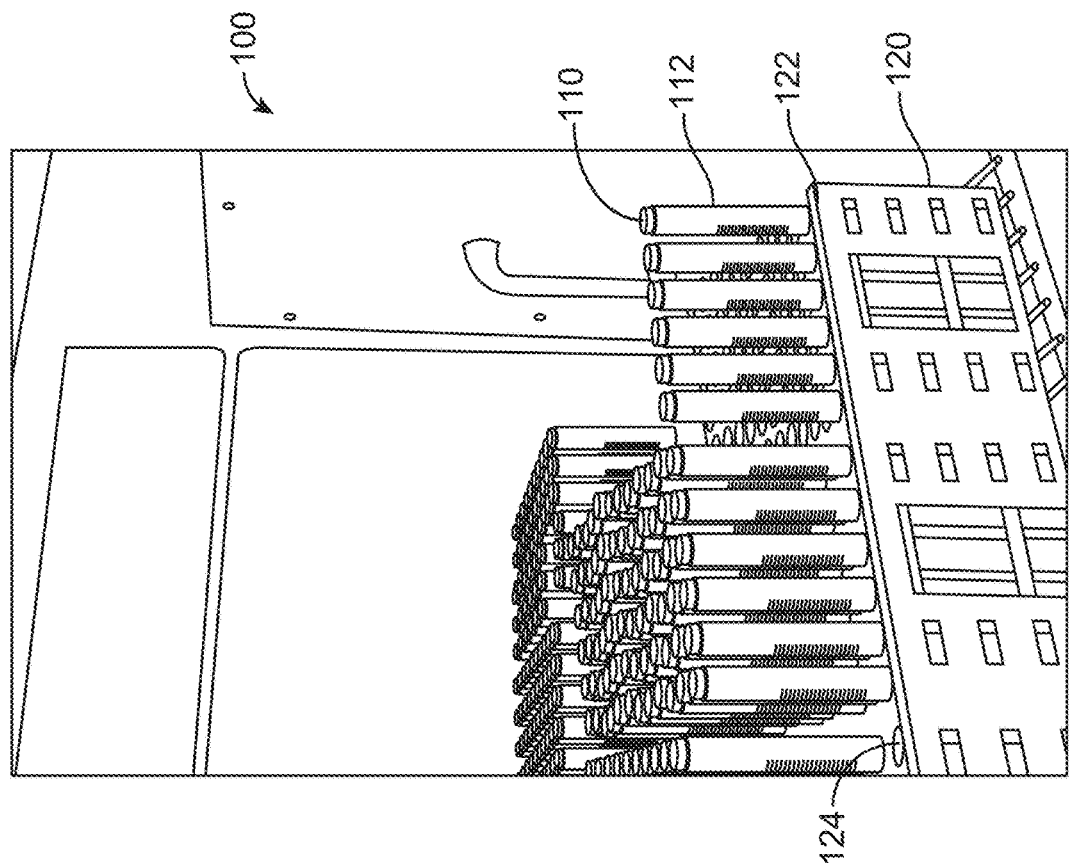
FIG. 1A is an example of a system for storing and dispensing immunoassay pens.

Referring now to FIG. 1A, a system 100 for storage of immunoassay devices is shown. The system 100 includes pens 110 positioned within a container 120 (e.g., housing). The pens 110 can be tubes, housing, or other units that may be elongated (e.g., have a greater length than width) and can store a sample, such as a sample of an immunoassay. The container 120 includes a plurality of apertures 124, with the apertures 124 configured about a top surface 122 of the container 120 and extending therein. The apertures 124 are sized such that the apertures 124 can receive a lower portion of each of the pens 110 in a vertical configuration such that an upper portion 112 of the pens 110 extend from the apertures 124 and above the top surface 122 of the container 120, as shown in FIG. 1A.

The system 100 may prevent the use of a first in first out approach to managing the location and storage of the pens 110. In a FIFO model, the pens that were "first in" the container of the system can be the "first out." For example, if a first pen is placed in the container 120 of the system 100 two months prior to a second pen, a FIFO model dictates that the first pen should be used by a user prior to the second pen as the first pen was "first in" in the system 100 and should thus be "first out." This process can be advantageous, as the first pen exits the system 100 prior to an expiration date, which is presumably prior to that of the second pen and thus prevents the expiration and waste of the first pen. Accordingly, the system 100 desirably minimizes wasted materials and limits unnecessary costs. However, in the system 100, a user may select any of the pens 110 extending from the apertures 124 of the system 100, as all of the pens stored within the system 100 are accessible to said user. Accordingly, the pens 110 used by one or more users may not be used according to a desired FIFO model.

Given the many pens 110 stored within the container 120 of the system 100, the user may select one or more pens 110 at random for use. Accordingly, inventory procedures require individual counting of the container 120 (and, presumably more similar containers) in order to account for the pens 110 remaining stored in the container 120 as well as the vacant apertures 124 indicating usage of the pens 110. Improving efficiency of inventory procedures and expediting such processes is advantageous, but may not be possible with systems such as system 100.

Referring now to FIG. 1B, a system 150 for storage of immunoassay devices is shown. The system 150 is similar to the system 100 of FIG. 1A, and may be similarly difficult to use to implement a FIFO model. The system 150 shown includes a container 120 holding the pens 110. The container 120 includes sidewalls 162 defining a width thereof, as well as a retaining plate 164 coupled to the sidewalls 162 and running perpendicular thereto. The retaining plate 164 shown occupies only a lower portion of a front face of the container 120 and, accordingly, the pens 110 are accessible to a user. The pens 110 shown have a lengthwise orientation and are stacked on top of one another within the container 120.

Similar to the system 100 as shown in FIG. 1A, both usage and inventory procedures are affected by the structure of the system 150. For example, with regard to usage, a user may select any of the pens 110, as all are in a position for the user to select. Accordingly, this structure is not conducive to the implementation of a FIFO model, as the pens 110 that are "first in" the container 120 may not be selected by users as "first out", as nearly all pens 110 are accessible to the user for removal and use. Accordingly, "first in" pens 110 may not be used and expire, while "first out" pens 110 may be newer pens further from expiration. Accordingly, the system 150 and structure of the components of risks wasted materials and increased costs.

In managing inventory, each individual pen 110 remaining within the container 120 must be counted, without any means for distinguishing between different lots or subsets of the pens 110 within the container 120. Accordingly, inventory processes and procedures conducted for the pens 110 stored within the container 120 of the system 150 may not be conducive to efficient and accurate inventory results. Similar to the system 100 of FIG. 1A, a system conducive to more efficient inventory processes and procedures as well as FIFO model implementation is desirable.

Figure 2:
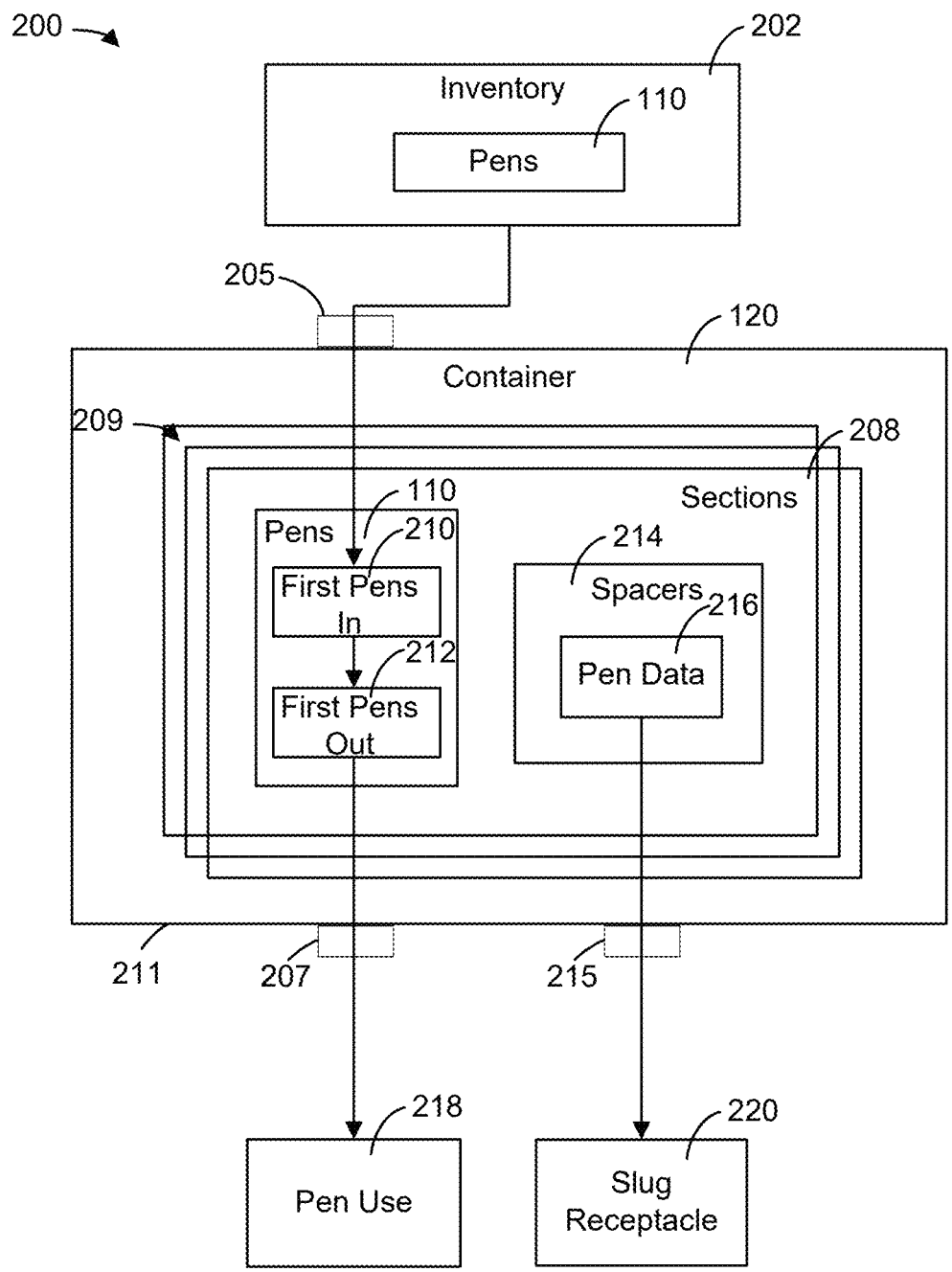
FIG. 2 is a schematic diagram of an example an inventory system for storing and
dispensing immunoassay pens.

Referring now to FIG. 2, shown is a system 200 for storing and dispensing immunoassay devices. The system 200 can operate with the pens 110 as shown FIGS. 1A-B, as well as various other immunoassay devices.

The system 200 is shown to include an inventory 202 of the pens 110. The inventory 202 of the pens, as shown in FIG. 2, can be separate from a container 120. Prior to use, the pens 110 can transfer to the container 120 where the pens can be organized and placed according to various user preferences. The inventory 202 may include various pens 110 with varying expirations dates and contents, for example. Specific quantities of the pens 110, both in the inventory 202 may vary and similarly the capacity of the container 120 can vary.

The container 120 can include sections 208 disposed within the container 120. Dividers 209 separating the sections from one another can define the sections 208. Additionally, the size of the sections 208 within the container 120 can be similar to both the pens 110 held therein as well as the size of the container 120. For example, if the container 120 stores larger pens 110, then the sections 208 can be larger. The depth of the sections 208 can equal the length of the pens 110. The depth of the sections 208 can be 10 percent greater than the length of the pens 110. The width of the sections 208 can equal the width of one pen 110, or five pens 110, or ten pens 110. In some embodiments, the dividers defining the sections 208 can be adjustable, which is to say that the sections can adjust to accommodate various sizes of the pens 110 and various quantities thereof. The container 120 can include an input 205, such as an input slot, that receives the pens 110. The input 205 can include a removable lid or other device to cover the input. The container 120 can include an output 207 such as a removal slot. The input 205 of the container 120 can be vertically above the removal slot.

The pens 110 can be stored within the sections 208 of the container 120, as shown in FIG. 2. Upon placement into the container 120 (e.g., via the input of the container 120), the pens 110 can be placed within one or more of the sections 208. When placed in the one or more sections 208, the pens 110 can be as close as possible to the bottom of the container 120. For example, in the event that the pens 110 are placed within a section 208 that does not contain any other pens 110, some of the pens 110 can become first pens in 210 and accordingly would rest on a bottom surface 211 of the container 120. The remainder of the pens 110 can rest on top of the pens 110 in contact with the bottom surface 211. The first pens in 210 in contact with the bottom surface 211 of the container 120 would be positioned adjacent the output 207, which may be a removal slot. Accordingly, as the first pens in 210, first placed in the container 120, exit via the removal slot and thus become first pens out 212, the pens 110 that initially rested on top of the first pens in 210 reposition closer to the removal slot. Accordingly, the system 200 can enable a FIFO model such that the pens 110 first introduced to the container 120 are in a position such that the first pens in 210 are accessible for removal by a user and can be the first pens 212 out of the container 120.

Spacers 214 can provide within the container 120, as shown in FIG. 2. The spacers 214 may be of various sizes and shapes to accommodate various container, section, and pen sizes. Additionally, the spacers 214 can have a size accommodating removal from the container 120 via the output, which may include the removal slot described previously. Prior to and/or after placing a lot or subset of pens 110 within a section 208 of the container 120, spacers can be in the same section 208 of the container 120. For example, given an empty section of the container 120, a first subset of the pens 110 can be within the section 208 of the container 120. Prior to placing a second subset of the pens 110 on top of the first subset of the pens 110, a spacer 214 can be on top of the first subset of the pens 110. The spacer 214 placed on top of the first subset of the pens 110 can occupy the area of the given section 208 in its entirety such that any pens 110 placed on top of the spacer 214, such as the second subset, are kept separated from the first subset by the spacer 214. In some embodiments, the spacer 214 is disposed adjacent to the first subset of the pens 110 and adjacent to the second subset of the pens 110, wherein the spacer 214 is disposed between the first subset of the pens 110 and the second subset of the pens 110. The pens 110 can define a first volume along the container 120. The pens 110 can traverse through the container 120, towards the output 207, unless the spacer 214 defines a second volume equal to or greater than the first volume, and the second volume is between the first volume and the output 207. Once the spacer 214 is on top of the first subset of pens 110, the second subset of the pens 110 can be on top of the spacer 214. This process can repeat for multiple subsets of the pens 110 in conjunction with multiple spacers 214 for multiple sections 208 within multiple containers 120.

The spacers 214 can include or indicate pen data 216, which is provided on the spacers 214. The pen data 216 can include various data relating to one or more pens 110 that were either above or below the spacer 214 within one of the sections 208. For example, the data 216 relating to one or more subsets of pens 110 may include information regarding said pens 110 such as expiration date, quantity of subset, subset identification, intake date, section within container 120, as well as other possible data. In some embodiments, the pen data 216 may be disposed on a material coupled to the spacer 214, or may be printed or otherwise provided directly on the spacer 214.

The system 200 can include a pen receptacle 218 and a spacer receptacle 220, as shown in FIG. 2. The pens 210, following removal from the container 120 and use by a user, can be collected in the pen receptacle. Similarly, once one of the spacers 214 exit the container 120 via a spacer output 215, thus indicating either the beginning or end of a subset of pens 110 within the container 120, the spacer 214 can be placed in the spacer receptacle 220. By collecting the spacers 214 having the pen data 216 indicating the quantity of any subsets of pens, inventory of the pens 110 that have been used can be conducted by counting the spacers collected within the spacer receptacle. With regard to the pens 110 still within the container 120, the container 120 includes at least one transparent wall to allow counting of the spacers 214 within the container 120. In the event that the container includes a subset of the pens 110 that has been partially but not completely removed for use with some of the pens 110 thereof remaining within the container 120, the portion of the one subset of the pens 110 are countable. Ultimately, when conducting inventory procedures in conjunction with the system 200, the spacers 214 may be counted (according to the pen data 216) to determine the quantity of pens 110 used and remaining within the container 120, with only a portion of a subset of pens 110 that may require individual counting. This, as opposed to the inventory processes required for either of the known systems as shown in described in FIGS. 1A-B, offers increased efficiency.

Figure 3:
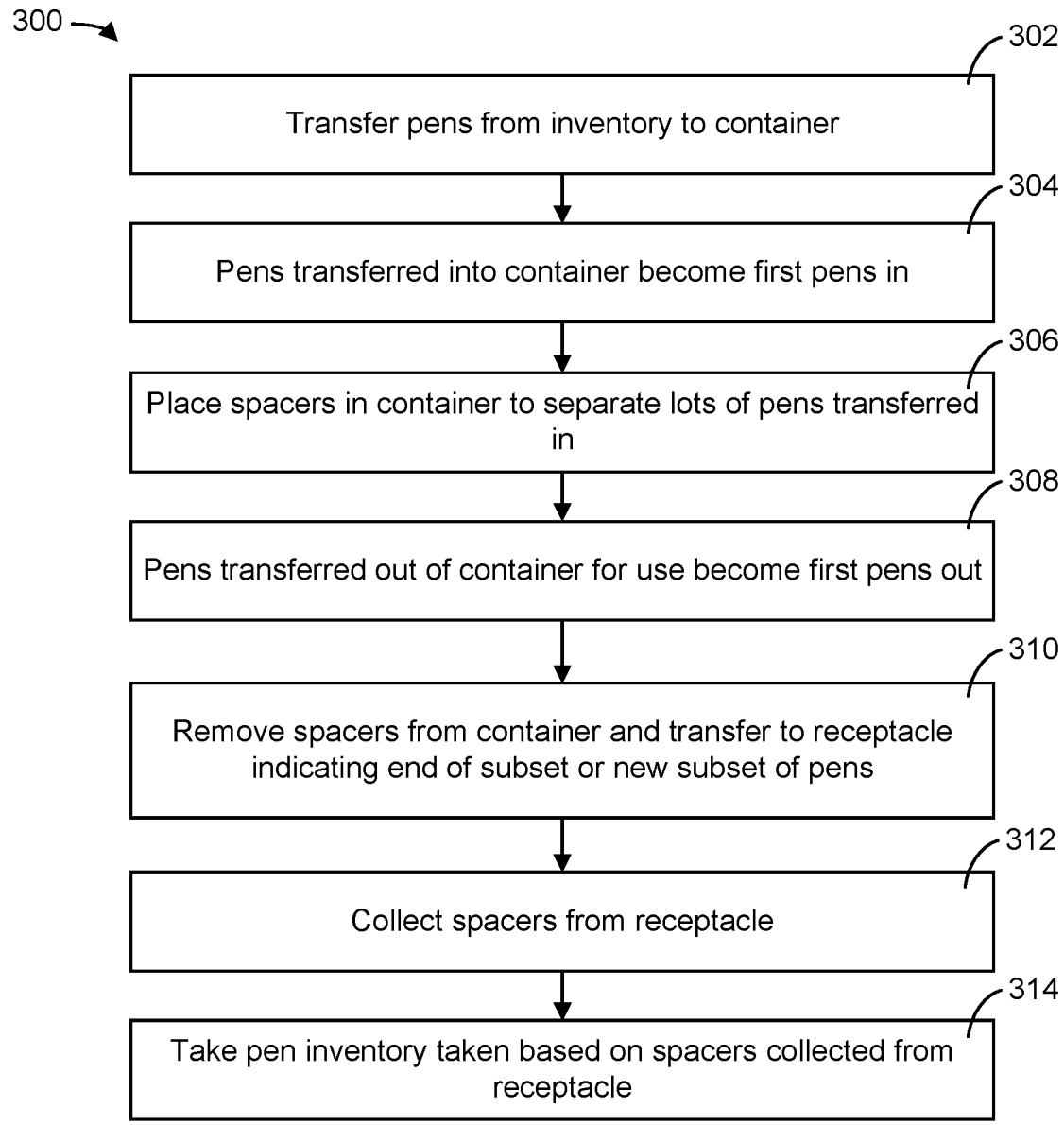
FIG. 3 is an example of a process of storing and dispensing immunoassay pens that can be performed by the inventory system of FIG. 2.

Referring now to FIG. 3, shown is a process 300 for storing and dispensing immunoassay devices. The process 300 can execute by or in conjunction with the components of the system 200 as shown and described with reference to FIG. 2.

The process 300 can include transferring pens from the inventory to the container (step 302). Pens can be transferred from an inventory into a container. The pens transferred in step 302 may vary in size, shape, contents, and other parameters, but are within a section such as section 208 of the container. When placed in the container, the pens may accompany one or more spacers, which may be above and/or below the pens within the section of the container. Transferring pens from the inventory to the container can repeat for multiple subsets of pens as needed to store said pens in the container.

The process 300 can include the pens transferred into the container becoming the first pens in (step 304). For example, the pens transferred into the container can be in a position such that said pens become the first pens in in accordance with a FIFO model. If the section that the pens enter already has pens, then the entering pens can be the first pens in relative to the pens already in the section. The pens already in the section can be the first pens out. If the section in which the pens are in is empty, then the pens of can become the first pens in the section and are accordingly in a position at the bottom of the section of the container.

The process 300 can include placing spacers in the container to separate subsets of pens transferred in (step 306). The spacers placed within the sections and accompanying the pens include data indicating specifics of said pens, which may include quantity, expiration date, contents, as well as other information. The spacers may also separate the pens previously transferred in from any pens already existing in the section of the container.

The process 300 can include transferring the pens out of the container for use, the transferred out pens becoming the first pens out of the container (step 308). The pens previously placed in the section of the container can transition from becoming the first pens in the container to the first pens out of the container, thus implementing the FIFO model. If the previously placed pens add to the section of the container already having pens, then the pens previously placed reposition by use of the pens that were already in the section of the container. Such use would reposition the pens previously placed in the section of the container to become the pens that would be the first pens out of the container for future use.

The process 300 can include removing spacers from the container and placing the spacers in the spacer receptacle (step 310). Removing spacers can occur by removing several of the pens within the given section for use between spacer removals. For example, two spacers may be in the section having the previously placed pens, with one spacer below said pens and one spacer above said pens. The spacer positioned below said pens can be removed from the container prior to any of the pens being removed for use, and the spacer is placed in the spacer receptacle. The pens can then exit for use, with the pens then becoming the first pens out. Following removal and use all of the pens placed in the section of the container, the spacer positioned above the pens within the section of the container is repositioned through the use of the pens disposed below the spacer for removal from the container by the user. The spacer can then be disposed in the spacer receptacle, as was done with the previously removed spacer.

The process 300 can include collecting the spacers from the receptacle (step 312). The spacers placed in the spacer receptacles, once positioned above and below the pens prior to step 310, are collected. The collection of the spacers positioned above and below the pens placed within the section of the container can indicate removal and usage of said pens. In the event that multiple subsets of pens are within a section of the container, multiple spacers may be positioned between the subsets and accordingly more than two spacers may be collected from the spacer receptacle.

The process 300 can include taking inventory based on the spacers collected from the spacer receptacle (step 314). As indicated previously with regard to step 312, the spacers collected from the spacer receptacle can indicate usage of any pens that were between the collected spacers. For example, four spacers can be in a section of the container. A first spacer can be at the bottom of the section. A first subset of pens can be above the first spacer. A second spacer can be above the first subset of pens and below a second subset of pens. A third spacer can be above the second subset of pens and below a third subset of pens. A fourth spacer can be above the third subset of pens. The collection of the four spacers from the spacer receptacle can indicate that all of the pens of the three subsets have been removed for use from the container. Accordingly, with respect to inventory, the spacer data disposed on the four spacers can indicate quantity for determining the quantity of pens removed from the container for use without counting single pens.

Figure 4:
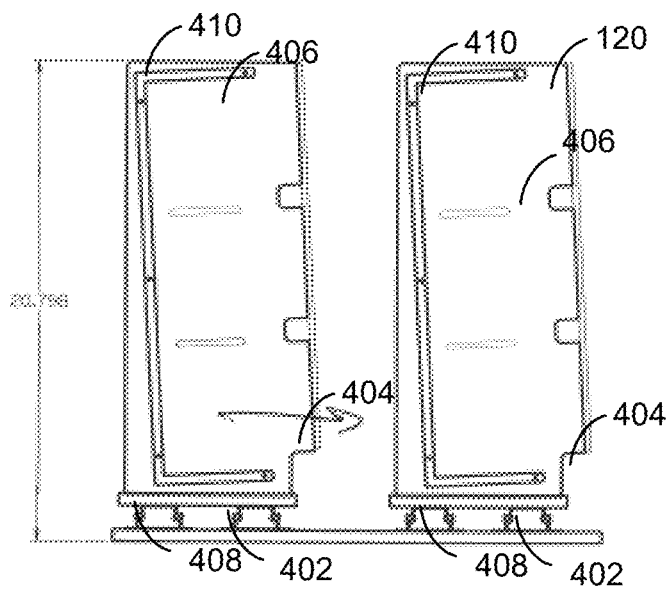
FIG. 4 is a side view of the system for storing and dispensing immunoassay pens of FIG. 2.
Figure 5:
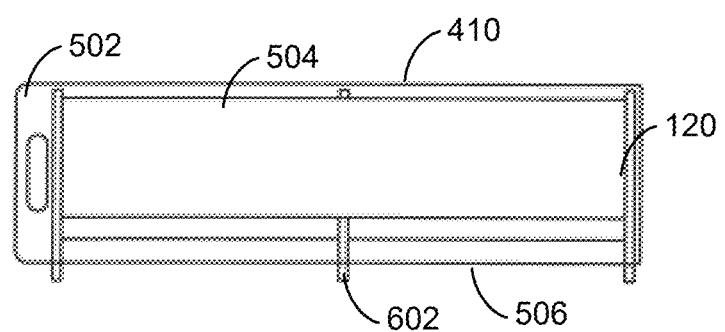
FIG. 5 is a top view of the system for storing and dispensing immunoassay pens of FIG. 2.
Figure 6:
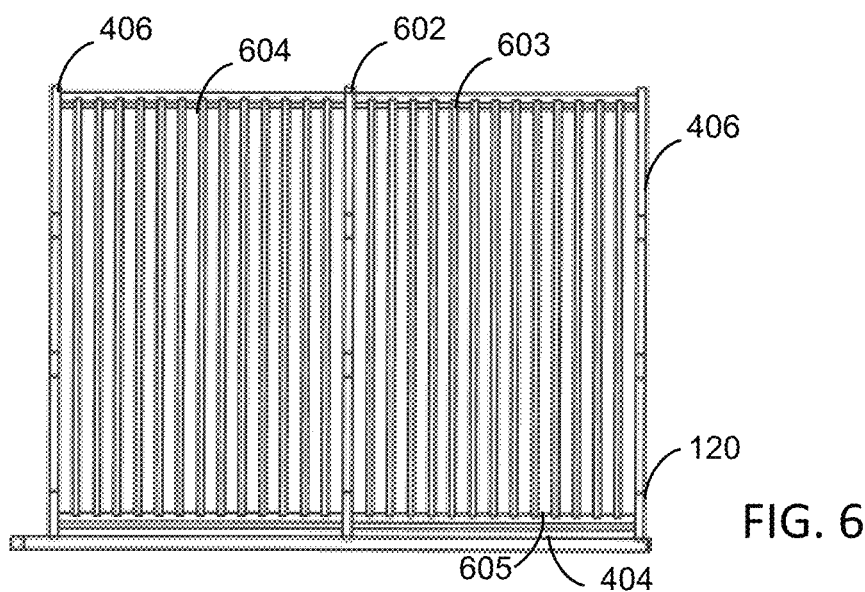
FIG. 6 is a front view the system for storing and dispensing immunoassay pens of FIG. 2.

Referring now to FIGS. 4-6, shown is an example of a container 120 for use in a system for storing and dispensing immunoassay. The container 120 can include a pair of sidewalls 406, as well as a base 408, a back wall 410, a lid 504, and a front wall 506. The base 408 can rest on a surface, or can be disposed on a cart such as cart 402 as shown in FIG. 4 thus enabling mobility of the container 120. As shown in FIG. 4, the container 120 can adjust to have a pitched orientation.

The base 408 may also include a handle 502 disposed at an end thereof such that the handle 502 extends from the container 120, such as shown in FIG. 5. The sidewalls 406 can extend vertically from ends opposite the length of the base 408, and can be parallel to one another spanning the width of the base. Similarly, the back wall 410 and front wall 506 can be opposite the width of the base and extend parallel from one another along the length of the base. Each of the pair of sidewalls 406 can couple to both the back wall 410 and the front wall 506 at corners of the base 408. Additionally, the base 408 can couple to lower portions of the sidewalls 406 as well as the back wall 410. The lid 504 can have a footprint and shape substantially the same as the base 408, and can couple to upper portions of the sidewalls 406, the back wall 410, and the front wall 506. In some embodiments, the lid 504 may be hinged, or otherwise partially or completely releasable from the other components of the container to permit placement of contents within the container. The container 120 can include a slot 404 disposed between the bottom of the front wall 506 and the base 408, with the slot 404 extending along the length of the base between and defined laterally by the sidewalls 406.

As shown in FIG. 6, the container 120 can include a central divider 602 disposed substantially equidistant from each of the sidewalls 406, extending from the base 408 to the lid 504 vertically, and having a depth extending from the front wall 506 to the back wall 410. In some embodiments, the central divider 602 can provide structural support for the lid 504 and other components of the container 120. Similarly, the container 120 can include auxiliary dividers 603 disposed between the sidewalls 406, and extending from the base 408 to the lid 504 vertically, and having a depth extending from the front wall 506 to the back wall 410. The central divider 602 can have a thickness greater than that of the auxiliary dividers 603. Collectively, the sidewalls 406, the central divider 602, and the auxiliary dividers 603 laterally define sections 604 configured along the length of the base, the sections 604 further defined vertically by the base 408 and the lid 504 and having a depth defined by the back wall 410 and the front wall 506. In some embodiments, the slot 404 can connect with a bottom portion 605 of the sections 604 such that various components are removable from the sections 604. According to various embodiments, the width of the sections 604 may be variable. In some embodiments, auxiliary dividers 603 may be adjustable such that a user may alter the quantity and size of the sections 604 within the container 120. Further, as the dimensions of the container vary with regard to volume (e.g. base 408, lid 504, front wall 506, back wall 410, sidewalls 406), the depth and height of the sections 604 can vary accordingly.

Figure 7:
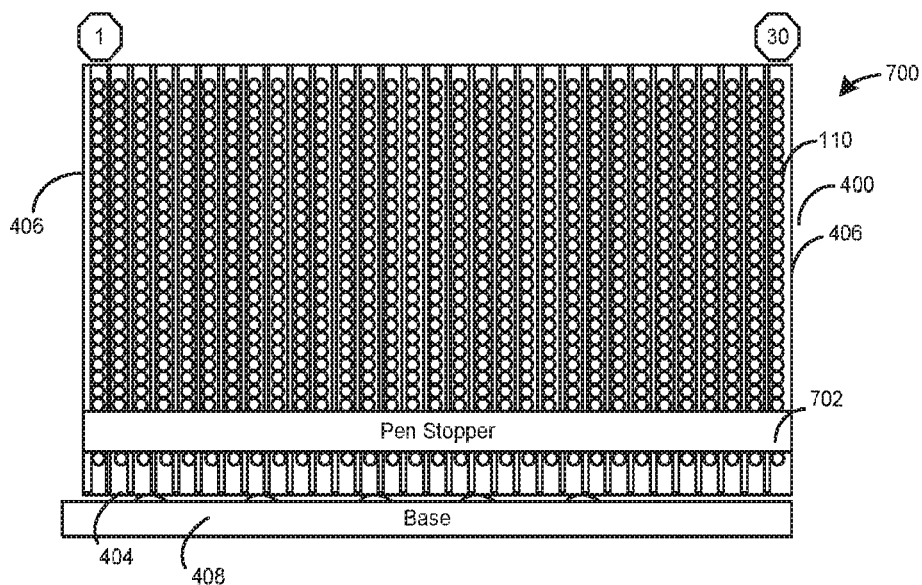
FIG. 7 is a front view of the system for storing and dispensing immunoassay pens of FIG. 2.

Referring now to FIG. 7, shown is a system 700 for storing and dispensing immunoassay from the container 120. The system 700 can include pens, which may be the same as or similar to those as shown and described previously. The pens can be disposed within each of the sections 604 and positioned in a lengthwise orientation such that a user may observe the ends of the pens through the front wall 506, which FIG. 7 shows as transparent. Additionally, the system 700 can include a pen stopper 702 configured adjacent the slot 404 and extending lengthwise between the two sidewalls 406. The pens are positioned such that the first pens inserted into each of the sections 604 from the top of the container 120 (by removing or opening the lid 504) are positioned to be the first pens removed from the respective sections 604, thus enabling a FIFO process. As pens exit from the container 120 via the slot 404, pens positioned above the removed pens can reposition closer to the slot 404.

The system 700 may be modified in a variety of ways in order to accommodate various preferences. For example, if the pens were larger (e.g. wider), the sections 604 may be proportionally larger to accommodate said pens. Additionally, in some embodiments the sections 604 may be larger, either as a function of a larger container 120 or fewer sections 604, to accommodate a greater quantity of pens therein. As shown in FIG. 7, the container 120 may not include a central divider, such as central divider 602 as shown in FIGS. 4-6. In some embodiments, the sidewalls 406 and the back wall 410 can support the container 120 without needing additional support from a central divider.

Figure 8:
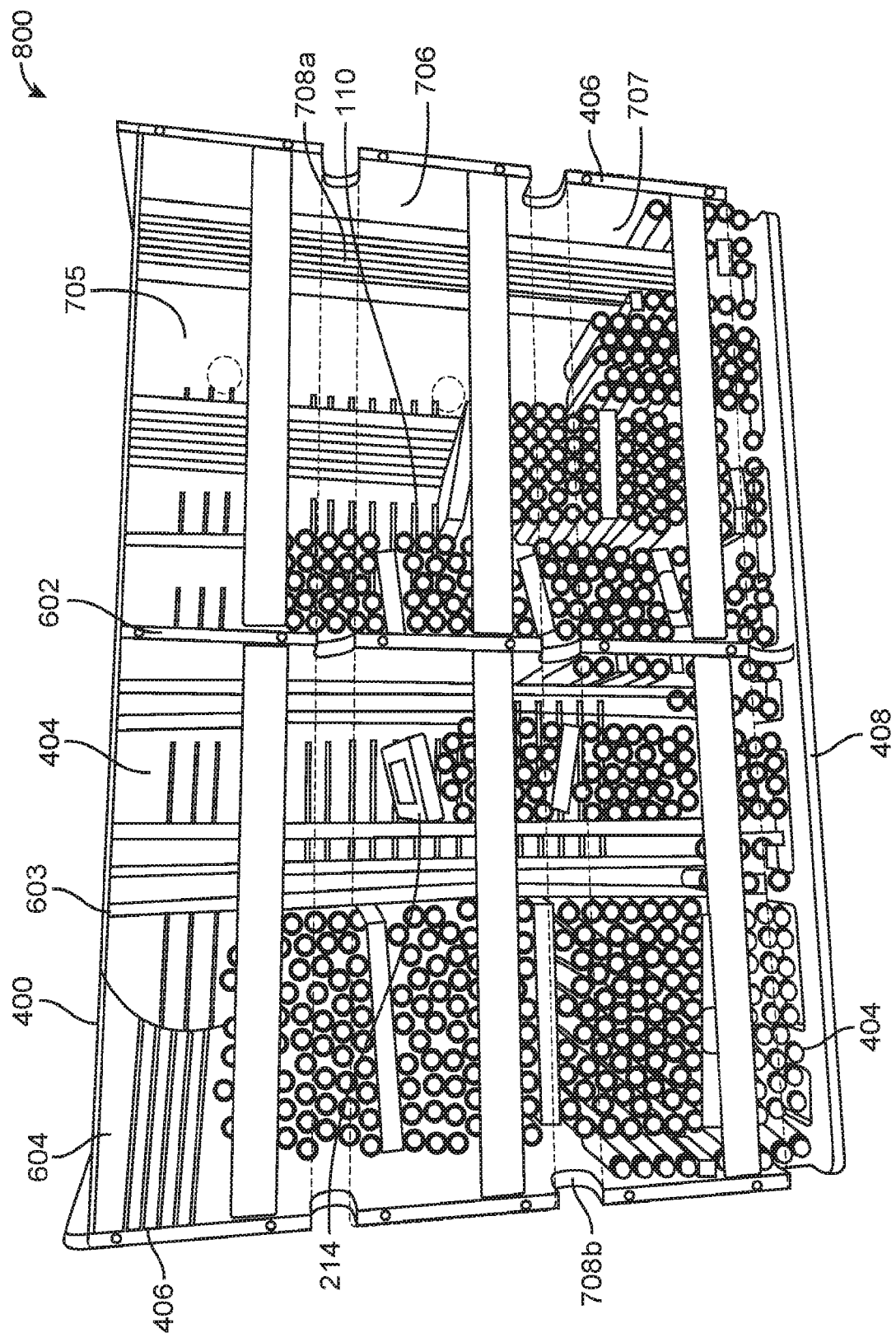
FIG. 8 is an example of a system for storing and dispensing immunoassay pens.
Figure 9:
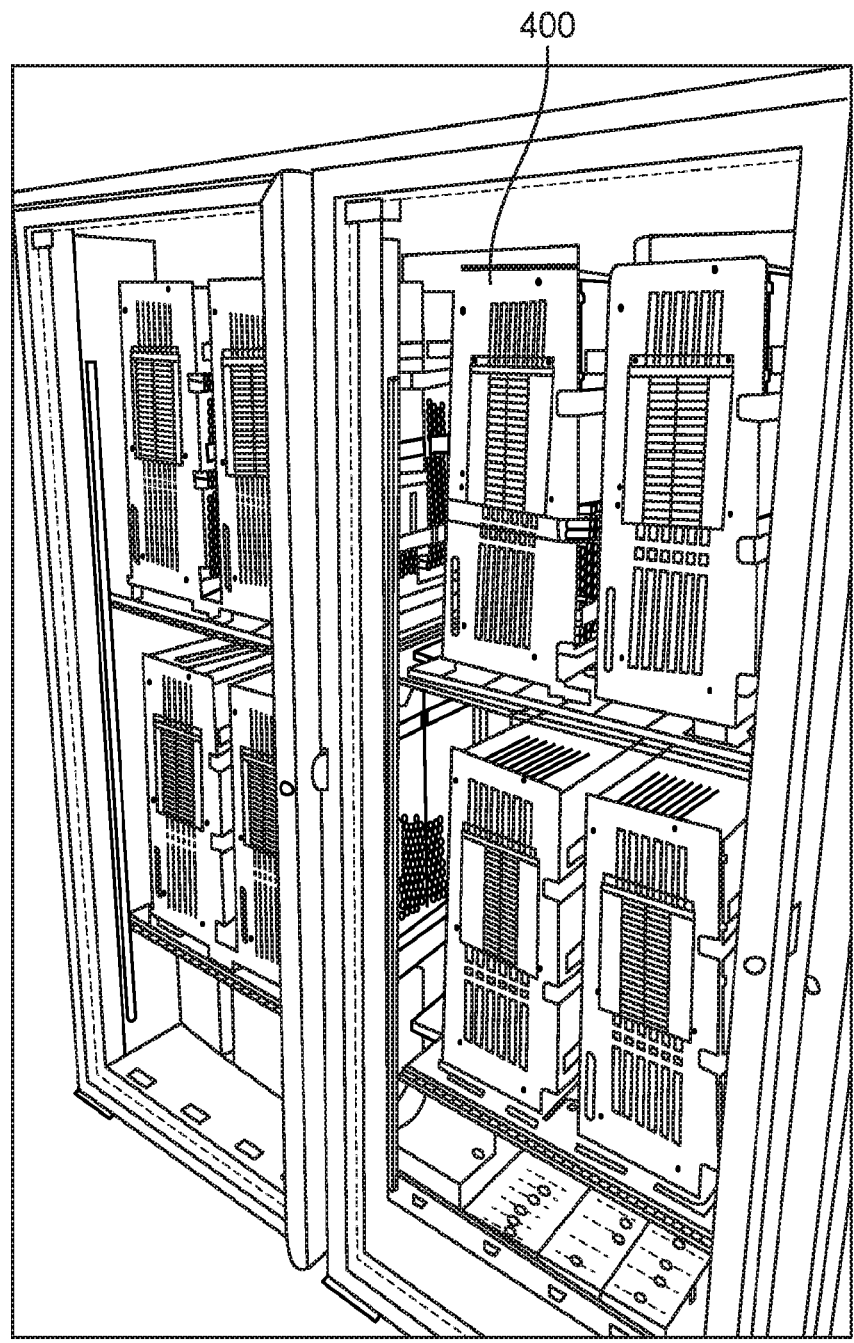
FIG. 9 is a perspective view of an example of a system for storing and dispensing immunoassay pens.
Figure 10:
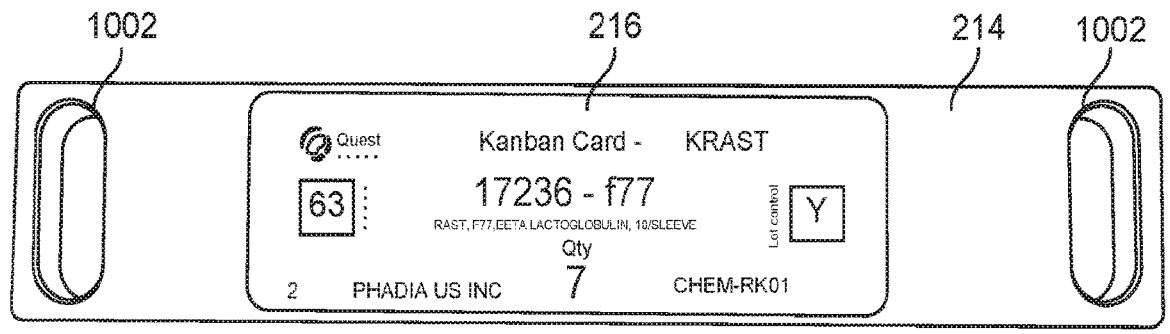
FIG. 10 is a top view of an example of a spacer that can be used in conjunction with the system for storing and dispensing immunoassay pens as shown in FIG. 8.
Figure 11:
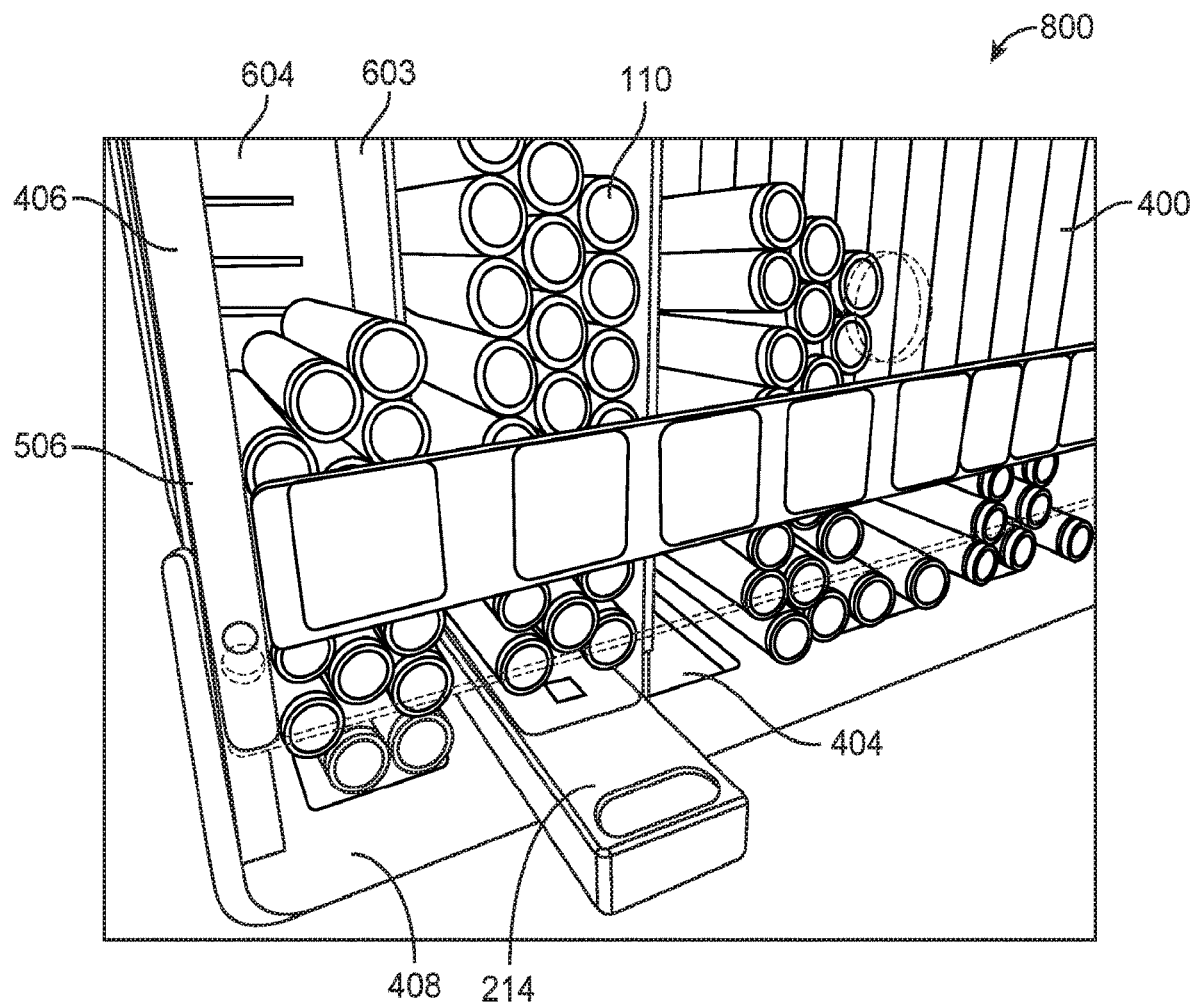
FIG. 11 is a perspective view of the spacer of FIG. 10 that can be used in conjunction with the system for storing and dispensing immunoassay pens as shown in FIG. 8.
Figure 12:
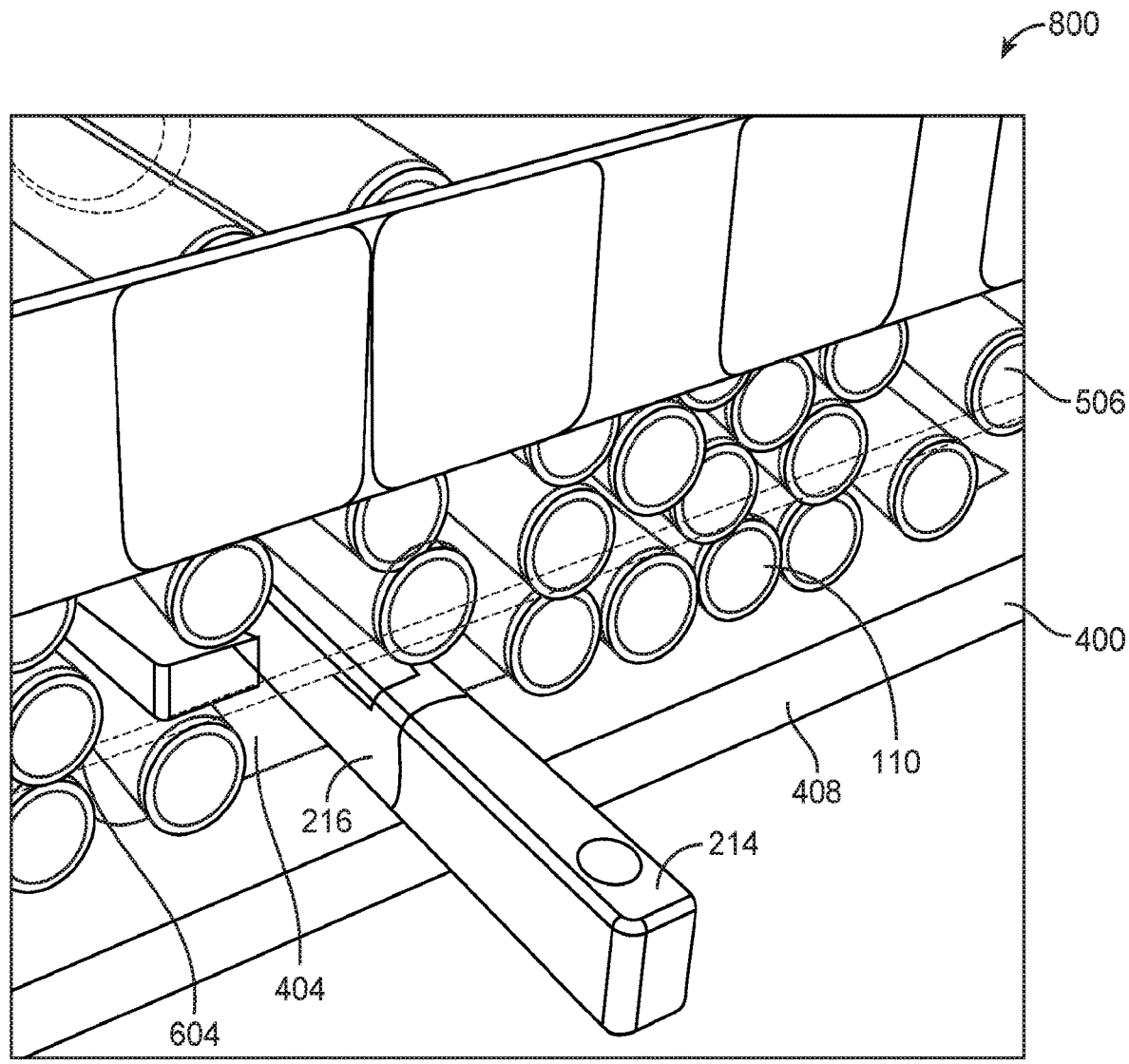
FIG. 12 is a perspective view of an example of a spacer that can be used in conjunction with the system for storing and dispensing immunoassay pens as shown in FIG. 8.

Referring now to FIGS. 8-12, shown is a system 800 for storing and dispensing immunoassay. The system 800 can include the container 120, but in a different configuration than that the system 700. As shown in FIGS. 8, 11, and 12, the container 120 includes multiple sections 604 defined by auxiliary dividers 603, as well as the central divider 602. The system 800 can include fewer sections 604 than the system 700, with the sections 604 of the system 800 not having an equal size. The sections 604 can have a size for holding different quantities of pens. For example, some of the sections 604 of the system 800 are configured to accommodate a single pen width-wise, while other sections 604 of the system 800 are configured width-wise to accommodate multiple pens therein.

Within each of the slots 404 are the spacers. The spacer 214 as shown in FIG. 10 can include a pair of handles 1002 disposed on opposite ends of the spacer to facilitate removal from containers, such as the container 120 as shown in the system 800. Upon removal from the container 120, the spacer can be in the spacer receptacle. In various systems including the system 800, the spacer can be larger and/or smaller to fit appropriately within differently sized sections 604. In some embodiments, the spacers of the system 800 can have a size corresponding to the section 604. For example, a section 604 that is wider can require a spacer that is wider to ensure separation between the pens positioned above the spacer and the pens positioned below the spacer. The spacer that is as wide as the section 604 can keep the pens in the order that they entered the container to facilitate FIFO operation. Additionally, spacers sized relative to the sections 604 ensures that the pen data (disposed on the spacer) remains accurate with regard to quantity of pens between the spacers, and thus ensures that inventory taken from the spacers that are removed from the container 120 corresponds to the pens that were removed.

The front wall of the system 800 is shown to be segmented, as compared to the front wall 506 of the system 700. In some embodiments, the front wall may include labeling indicating contents of various sections 604 defined by the front wall. Such labeling may also be on various portions of the front wall, such as the upper portion 705, the middle portion 706, and/or the lower portion 707.

As shown in FIG. 8, the front wall includes an upper portion 705, a middle portion 706, and a lower portion 707, with gap 708a configured between the upper portion 705 and the middle portion 706, and gap 708b configured between the middle portion 706 and the lower portion 707. Such gaps 708 in the front wall can allow for access to the various sections 604 within the container 120 of the system 800. The pens and the spacers can exit the container via the gaps 708. Removing the spacer can combine two separated sets of pens. For instance, if the spacer is between a first set of pens and a second set of pens, then removing the spacer can combine the first set of pens and the second set of pens into a third set of pens. By allowing removal of the spacers, the gaps 708 allow for the consolidation of the groupings of pens in the middle part of the queue of pens in the container. Similarly, removing a set of pens disposed between two of the spacers will remove that set of pens from the container. By allowing removal of the set of pens, the gaps 708 allow for the adjustment of the middle part of the queue of pens in the container. While the container can organize the pens on a strict FIFO basis, the gaps 708 allow the container to adjust the FIFO queue by combining or removing groupings of pens within the FIFO queue.

A perspective view of an example of the container 120 is shown in FIG. 9. As indicated previously, the container 120 and any systems of which the container 120 is included may include mobility features, such as the cart 402 as shown and described previously. Such mobility features can allow for movement of the container 120 within a facility, or storage of the container 120 as shown in FIG. 9.

As shown in of FIGS. 11-12, the slot 404 can extend along the length of the base 408 between the base 408 and the bottom of the front wall 506. A spacer can have a length up to the length of the slot 404. A spacer can have a length greater than or less than the pen. The spacer can have a length such that the data is visible outside of the slot 404 without withdrawing the pen. The slot 404 can be sized such that the height of the slot permits the removal of a single pen at a time from each section 604 (vertically speaking). For example, if the width of the section 604 is approximately the diameter of one pen, only one pen at a time can exit the section 604 via the slot 404, which can keep the pens in the order that they entered the container to facilitate FIFO operation.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

What is claimed is:

1. An inventory storage system comprising:
   a container comprising an upper surface, a lower surface, a back wall, and a front wall extending between a width of the upper surface and the lower surface, a first removal slot disposed between the front wall and the lower surface, and a pair of sidewalls facing a length of the upper surface and the lower surface;
   a plurality of dividers disposed between the pair of sidewalls along the length of the upper surface and the lower surface, each of the plurality of dividers extending from the lower surface and the upper surface, and extending from the front wall and the back wall, the plurality of dividers comprising a first divider and a second divider defining a section;
   a plurality of pens stored within the section of the container, the plurality of pens comprising at least a subset of first pens and a subset of second pens, wherein the subset of first pens is below the subset of second pens; and
   a spacer placed within the section of the container and spanning between the first divider and the second divider, the spacer to separate the subset of first pens and the subset of second pens,
   wherein the spacer is configured to prevent the subset of second pens from exiting the container via the first removal slot until the subset of first pens exit the container via the first removal slot, wherein the spacer is configured to be removed from the container via the first removal slot to indicate usage of the subset of first pens, and wherein the spacer is configured to be positioned within the section of the container at a predetermined interval among the plurality of pens such that a predetermined quantity of pens is disposed, wherein the predetermined quantity of pens corresponds to a quantity of the subset of first pens.

2. The inventory storage system of claim 1, wherein the spacer indicates an identifier of the plurality of pens stored within the container.

3. The inventory storage system of claim 1, wherein the front wall comprises a second removal slot disposed along the front wall and above the first removal slot.

4. The inventory storage system of claim 1, wherein the spacer between the subset of first pens and the subset of second pens exit the container via a second removal slot, the second removal slot disposed along the front wall and above the first removal slot, to combine the subset of first pens and the subset of second pens into a subset of third pens.

5. The inventory storage system of claim 1, wherein the subset of second pens exit the container via a second removal slot, the second removal slot disposed along the front wall and above the first removal slot, to remove the subset of second pens from the container prior to removing the subset of first pens.

6. The inventory storage system of claim 1, wherein the subset of second pens introduced to a particular section of a plurality of sections of the container are disposed on top of the subset of first pens and the spacer within the particular section of the plurality of sections of the container.

7. The inventory storage system of claim 6, wherein the subset of second pens are positioned further from the first removal slot than the subset of first pens and the spacer stored within the section of the container.

8. The inventory storage system of claim 1, wherein at least one pen comprises a tubular housing configured to receive a sample of material.

9. An inventory storage system comprising:
a container comprising an upper surface, a lower surface, a back wall and a front wall facing a width of the upper surface and the lower surface, a first removal slot disposed between the front wall and the lower surface, and a pair of sidewalls facing a length of the upper surface and the lower surface;
a plurality of components disposed between the pair of sidewalls along the length of the upper surface and the lower surface, each of the plurality of components extending from the lower surface to the upper surface, and extending from the front wall to the back wall, the plurality of components comprising a first component and a second component defining a section;
a plurality of products stored within the section of the container, the plurality of products comprising at least a subset of first products and a subset of second products, wherein the subset of first products is below the subset of second products; and
an indicator placed within the section of the container and spanning between the first component and the second component,
wherein the indicator is configured to separate the subset of first products and the subset of second products,
wherein the indicator is configured to prevent the subset of second products from exiting the container via the first removal slot until the subset of first products exit the container via the first removal slot, wherein the indicator is configured to be removed from the container via the first removal slot to indicate usage of the subset of first products, and wherein the indicator is configured to be positioned within the section of the container at a predetermined interval among the plurality of products such that a predetermined quantity of pens is disposed, wherein the predetermined quantity of products corresponds to a quantity of the subset of first products.

10. The inventory storage system of claim 9, wherein the indicator is configured to identify different sections of products stored within the container.

11. The inventory storage system of claim 9, wherein the indicator between the subset of first products and the subset of second products is configured to exit the container via a second removal slot, the second removal slot disposed along the front wall and above the first removal slot, to combine the subset of first products and the subset of second products into a subset of third products.

12. A method for inventory storage comprising:
inserting a first subset of a plurality of products between a pair of sidewalls of a container;
inserting a plurality of components between the pair of sidewalls, the plurality of components having a first component and a second component to define a section of the container;
attaching an indicator to at least one the plurality of components of the container adjacent to the first subset of the plurality of products to identify the section defined by the plurality of one or more components;
inserting a second subset of the plurality of products adjacent to the first indicator,
wherein the first subset of the plurality of products is below the first indicator, wherein the first indicator is below the second subset of the plurality of products; and
removing at least one product of the plurality of products from the section of the container through a first removal slot until the first indicator is disposed in the first removal slot to remove the first subset of the plurality of products while retaining the second subset of the plurality of products within the container.

13. The method of claim 12, further comprising inserting the second subset of the plurality of products after inserting the plurality of components and the first subset of the plurality of products.

14. The method of claim 12, wherein inserting the first subset of the plurality of products between the pair of sidewalls of the container comprises inserting the first subset of the plurality of products through an insertion slot above the first removal slot and between the pair of sidewalls of the container.

15. The method of claim 12, further comprising removing the indicator through the first removal slot while retaining the second subset of the plurality of products within the container.

16. The method of claim 15, further comprising counting the first subset of the plurality of products based on data associated with the first-indicator removed via the first removal slot.

* * * * *